(12) United States Patent
Siorek et al.

(10) Patent No.: US 7,783,740 B2
(45) Date of Patent: Aug. 24, 2010

(54) EMBEDDED NETWORK TRAFFIC ANALYZER

(75) Inventors: Timothy Siorek, Newbury, OH (US); Daniel J. Galdun, Huntsburg, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 1938 days.

(21) Appl. No.: 10/670,611

(22) Filed: Sep. 25, 2003

(65) Prior Publication Data

US 2005/0071445 A1 Mar. 31, 2005

(51) Int. Cl.
*G06F 15/173* (2006.01)
(52) U.S. Cl. .................. 709/224; 709/201; 709/202; 709/223; 709/248; 700/51; 700/34; 700/46; 700/52; 700/53; 700/73; 700/10; 370/328; 370/465; 370/252
(58) Field of Classification Search ............... 709/224, 709/223, 201, 202
See application file for complete search history.

(56) References Cited

U.S. PATENT DOCUMENTS

| | | | |
|---|---|---|---|
| 5,799,173 A | 8/1998 | Gossler et al. | |
| 5,850,386 A * | 12/1998 | Anderson et al. | 370/241 |
| 5,850,388 A * | 12/1998 | Anderson et al. | 370/252 |
| 6,681,232 B1 * | 1/2004 | Sistanizadeh et al. | 707/104.1 |
| 6,735,553 B1 * | 5/2004 | Frogner et al. | 702/186 |
| 6,816,973 B1 * | 11/2004 | Gleichauf et al. | 726/13 |
| 6,963,917 B1 * | 11/2005 | Callis et al. | 709/227 |
| 2002/0129127 A1 | 9/2002 | Romero et al. | |
| 2003/0110293 A1 * | 6/2003 | Friedman et al. | 709/245 |
| 2003/0118029 A1 * | 6/2003 | Maher et al. | 370/395.21 |
| 2003/0157895 A1 | 8/2003 | Agrawal et al. | |
| 2003/0195958 A1 | 10/2003 | Byron et al. | |
| 2004/0337217 | 2/2004 | Danzig et al. | |
| 2004/0109410 A1 | 6/2004 | Chase et al. | |
| 2004/0109450 A1 * | 6/2004 | Kang et al. | 370/390 |

FOREIGN PATENT DOCUMENTS

WO 9624210 8/1996

OTHER PUBLICATIONS

James Hall, Multi-Layer Network Monitoring and Analysis, Jul. 2003, University of Cambridge, Technical Report No. 571 Computer Laboratory UCAM-CL-TR-571, Cambridge, UK, pp. 1-78.

Tony McGregor, Quality in Measurement: Beyond the Deployment Barrier, IEEE Proceedings of the 2002 Symposium on Applications and the internet—Saint 02W, pp. 1-8.

C.S. Hood, et al., Probabilistic Network Fault Detection, Global Telecommunications Conference, 1996, Globecom'96, Communications: The Key to Global Prosperity London, UK Nov. 18-22, 1996 (Nov. 18, 1996), pp. 1872-1876.

(Continued)

*Primary Examiner*—Jude J Jean Gilles
(74) *Attorney, Agent, or Firm*—Turocy & Watson LLP; R. Scott Speroff; John M. Miller

(57) ABSTRACT

The present invention provides a system and method for interfacing to a network. The system includes a network interface comprising an embedded network traffic analyzer (NTA) capable of network traffic analyzer filter and capture capabilities. The NTA also includes an artificial intelligence component that facilitates diagnosing and/or prognosing state and/or health of the network (and/or components thereof).

14 Claims, 13 Drawing Sheets

OTHER PUBLICATIONS

European Search Report dated Jul. 4, 2005 for European Patent Application Serial No. EP04022887, 5 pages.
European Search Report dated May 11, 2006, mailed Nov. 16, 2006, for European Patent Application Serial No. 04022887.6, 6 pages.
Hani Jamjoom and Kang G. Shin, Persistent Dropping: An Efficient Control of Traffic Aggregates, Aug. 25-29, 2003, 11 pages.
Roman Lysecky, Susan Cotterell and Frank Vahid, "A Fast On-Chip Profiler Memory", Jun. 10-14, 2002, 6 pages.

* cited by examiner

Traffic Analyzer Filter Component

EMBEDDED NETWORK TRAFFIC ANALYZER

TECHNICAL FIELD

The present invention relates in general to computer network systems, and more particularly to a network interface comprising an embedded network traffic analyzer.

BACKGROUND OF THE INVENTION

Advances in computer network technologies continue to make sharing of information between systems increasingly efficient and affordable. Over the course of just a few short years, data transfer rates have increased from 10 Mbps to 100 Mbps to 1 Gbps. And the number of possible users on a given dedicated network continues to grow. New transmission infrastructures have emerged including wireless networks. These and other advances have resulted in an increasing exploitation of networked systems in government and industry, for both commercial and personal applications. Nearly every business or agency which has a need for more than one computer also has a need to share information among its' various users. Today, an increasing number of homes are either wired for networks or employ wireless networks as the number of computers in a typical home continues to rise. And there is a proliferation of smaller networks being linked or bridged together to create larger networks; allowing people and systems at one location to seamlessly share information with people and systems at another location.

As the quantity, speed, and complexity of networked systems has increased, there has been a corresponding increase in network problems and an escalating need to efficiently resolve such problems. When network problems arise, whether they are on ControlNet, DeviceNet, Ethernet, Wireless applications, or whatever the latest networking protocols and/or configurations may be, information relating to activity on the network must be obtained in order to resolve the problem. This generally requires the introduction of a dedicated, stand-alone, diagnostic device to the network known as a network traffic analyzer. A network traffic analyzer obtains key information about network traffic parameters and is capable of capturing and recording such data to provide a permanent record of communications on the network bus. Network traffic analyzers are capable of being controlled to begin and/or end recording based on the presence of certain conditions. Traditionally, a network traffic analyzer is a separate, dedicated piece of support equipment. Network traffic analyzers are generally PC based and require specific network interface hardware and software modules to adapt to a particular network standard or configuration. Often the network must be analyzed and the diagnostic information collected while the network is being utilized by the customer in a live environment. Trouble-shooting network problems requires configuring a network traffic analyzer with an appropriate network interface module and associated software. The vast majority of network users do not own the support equipment comprising the network traffic analyzer, interface module and associated software necessary for diagnosing the network problems. Therefore, support personnel must assemble the proper resources and bring them to the customer's site. Once assembled, a trained operator must be given access to the network in order to collect the data necessary for analysis. If for information security or other reasons, support personnel are not allowed access to the customer's network, or are net permitted to monitor network activities in a live environment, then an attempt may be made to recreate or simulate the network problems, sometimes in a laboratory or other similar environment. Such efforts require the duplication of extensive amounts of hardware and software and often result in futile attempts to reproduce the problem: it may prove impossible to truly duplicate the environment required for the problem to manifest itself. In almost all cases these options are time consuming, inefficient, expensive and often are ineffective in resolving the networking problem.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention provides for system(s) and method (s) that facilitate interfacing to a network. When network problems arise, generally, the most useful set of data meaningful to network diagnostics as well as prognostics is that which is obtained/captured with a network traffic analyzer (NTA). Conventionally, NTAs are separate, dedicated hardware items that required initially identifying as well as locating the appropriate NTA for a given task, and then coupling such NTA to a network to effect data capture for diagnostics. The subject invention mitigates some of the disadvantages (e.g., costs, labor, time . . . ) associated with employing conventional NTA schemes. More particularly, the present invention provides for network traffic analyzer filter and capture capabilities embedded into a network interface. Various configurations of the network interface are utilized to allow coupling to any suitable network protocol and configuration including, but not limited to, ControlNet, DeviceNet, Ethernet, and Wireless networking standards. In accordance with one particular aspect of the invention, any suitable device with a network interface and having access to the network can be used as a network traffic analyzer by embedding additional hardware and firmware into the device. After a device is properly configured with the additional hardware and firmware, the device can be employed to gather and analyze network data and statistics concurrent with normal network operations of the device.

Thus, the subject invention provides for a highly efficient, streamlined scheme for utilizing NTAs, by embedding functionality thereof into existing network interfaces. In addition to diagnostics, NTAs in connection with subject invention can employ advanced artificial intelligence based schemes (e.g., implicitly and/or explicitly trained classifiers) to also effect prognostics as to future state/health of the network and components thereof in addition to current state/health (e.g., diagnostics) of the network and its components.

In accordance with another aspect of the invention, the present invention can be utilized as a network traffic analyzer in lieu of the device's normal operations to collect and analyze data for trouble-shooting network problems. Complex sorting and searching tasks can be performed at a later point in time as post processing operations on a computer comprising the present invention, or data gathered by the computer comprising the present invention can be transferred via the network to another processor for post processing and analysis. Data capture capabilities are often limited in a given networked device by available memory and memory access bandwidth of the device. In accordance with another particular aspect of the invention, a memory controller provides memory priority for normal network operations and utilizes remaining available memory bandwidth to save network traffic data to memory. In the event more bandwidth is required for the network traffic analyzer function(s) than is presently available after supporting the device's normal network operations, an additional network interface module comprising the required hardware, software, and firmware can be utilized in any suitable available interface slot connected to the network. If necessary, the additional interface module can have its operation dedicated solely for network traffic analysis.

In accordance with yet another aspect of the invention, one device on the network is configured with a network traffic analyzer's data acquisition and filter component while other devices connected to the network are configured with a network traffic analyzer's post analysis and display component. In such a configuration, remote access to the device containing the network traffic analyzer data acquisition and filter component can be accomplished by any number of the devices configured with the network traffic analyzer post analysis and display component. Bridging techniques allow access to and control of the device comprising the data acquisition component across one or more networks of similar or differing types. According to another aspect of the invention, a processor with a network traffic analyzer control component can assume control of the data acquisition and filter component within another networked device located in a very remote location from the device containing the data acquisition and filter component.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

The present invention relates to networked systems, and more particularly to a network interface comprising an embedded network traffic analyzer. The present invention provides a system and method for interfacing to a network comprising more than one device, the system providing an embedded network traffic analyzer. The present invention provides basic network traffic analyzer filter and capture capabilities embedded into a network interface, thereby eliminating the need for a separate dedicated network traffic analyzer for most routine applications.

As used in this application, the terms "component", and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 1:
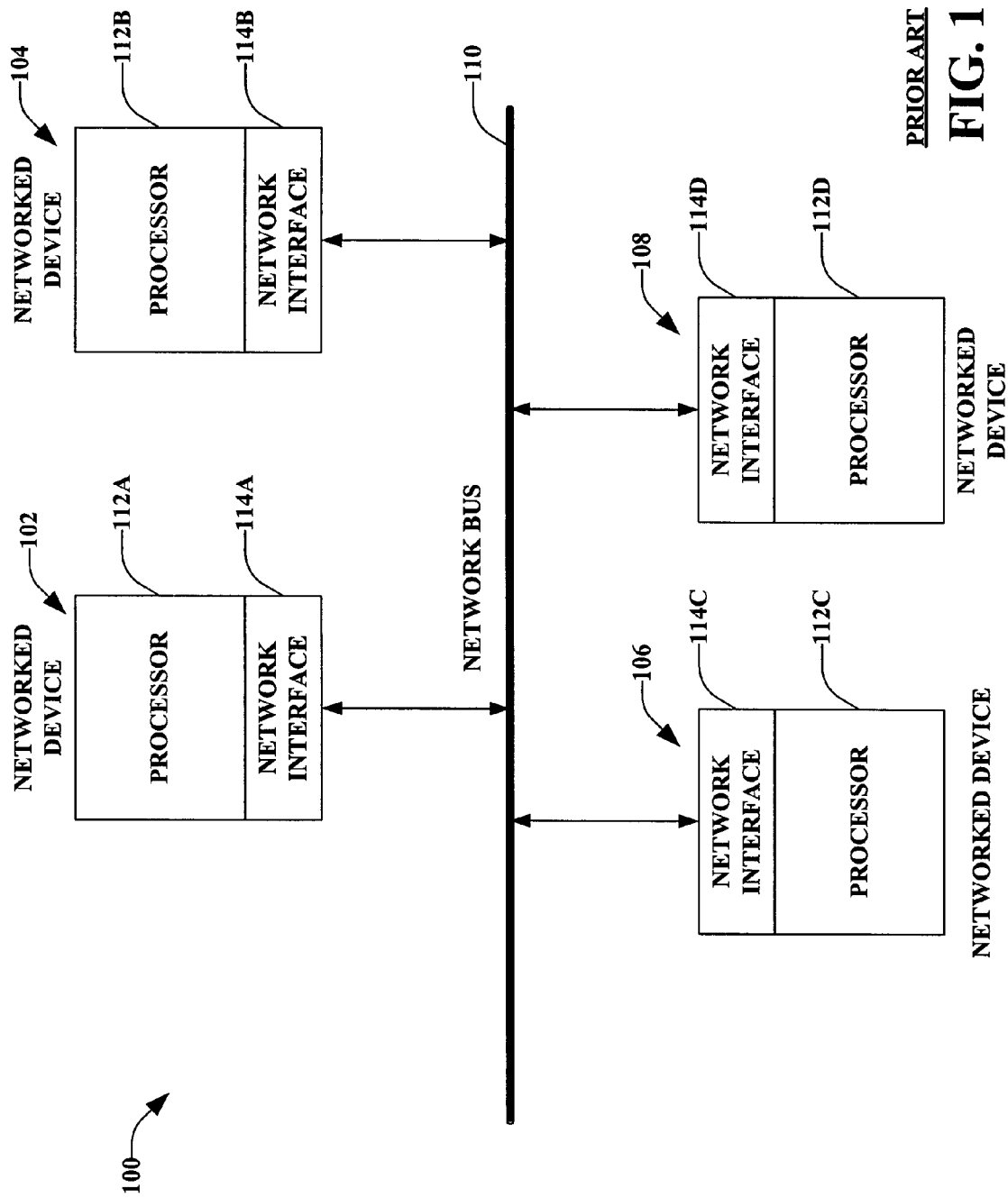
FIG. 1 is an illustration of a prior art networked system of multiple devices.

FIG. 1 is an illustration of a prior art networked system 100 of multiple devices. The illustrated network comprises a plurality of networked devices 102, 104, 106, and 108. The networked devices are linked together by a bus 110. In the illustrated system 100, the bus 110 comprises a CAT 5 wiring cable, but it is understood that the bus 110 can be any suitable medium for transferring data (e.g., COAX cable, telephone cable, CAT 3 wiring cable, wireless communications means), or other similar means, for passing information between systems. Each networked device is comprised of a processor 112 and a network interface 114. The networked devices can be various type of controller systems, I/O devices and modules, personal computers (PC's), network servers, network memory, or other devices comprising a processor and network interface such as a network printer, a network scanner or other peripheral device. Each networked device requires a network interface 114 to provide an interface between the networked device and the bus 110.

In normal operation, by following the proper network protocol, the networked devices 102, 104, 106 and 108 each may transmit information to and receive information from any of the other devices on the network via the communications means 110. If a network problem should arise, it may be very difficult to determine the source of the problem. In such cases, a dedicated network traffic analyzer is employed to monitor and capture data from the network.

Figure 2:
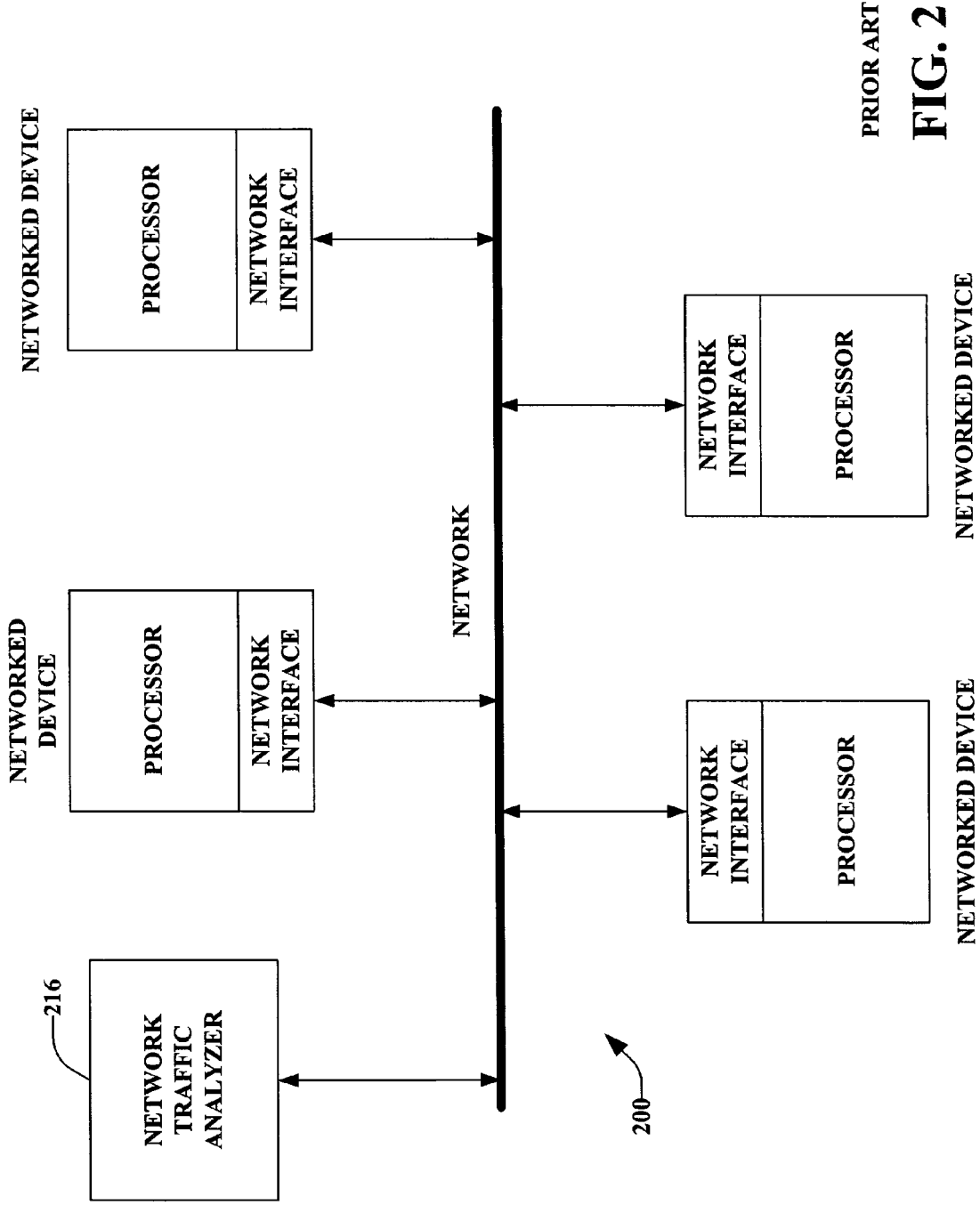
FIG. 2 is an illustration of a networked system where a dedicated network traffic analyzer has been added for diagnostic purposes.

FIG. 2 is an illustration of a networked system 200 where a dedicated network traffic analyzer 216 has been added to the network for diagnostic purposes. As noted, the use of a dedicated network traffic analyzer is often time consuming, inefficient and expensive for the network user. Most users do not have the necessary support equipment (i.e. dedicated network traffic analyzer, plug in modules, software, firmware . . . ) or trained personnel to handle network problems. Furthermore, the presence of an additional device not normally a part of the network alters the network configuration and the loading on the bus. This can sometimes mask the problem and/or create a new problem. It would be beneficial if the network problem could be diagnosed without the need to add dedicated support equipment which alters the configuration of the network system and alters the load on the bus.

Figure 3A:
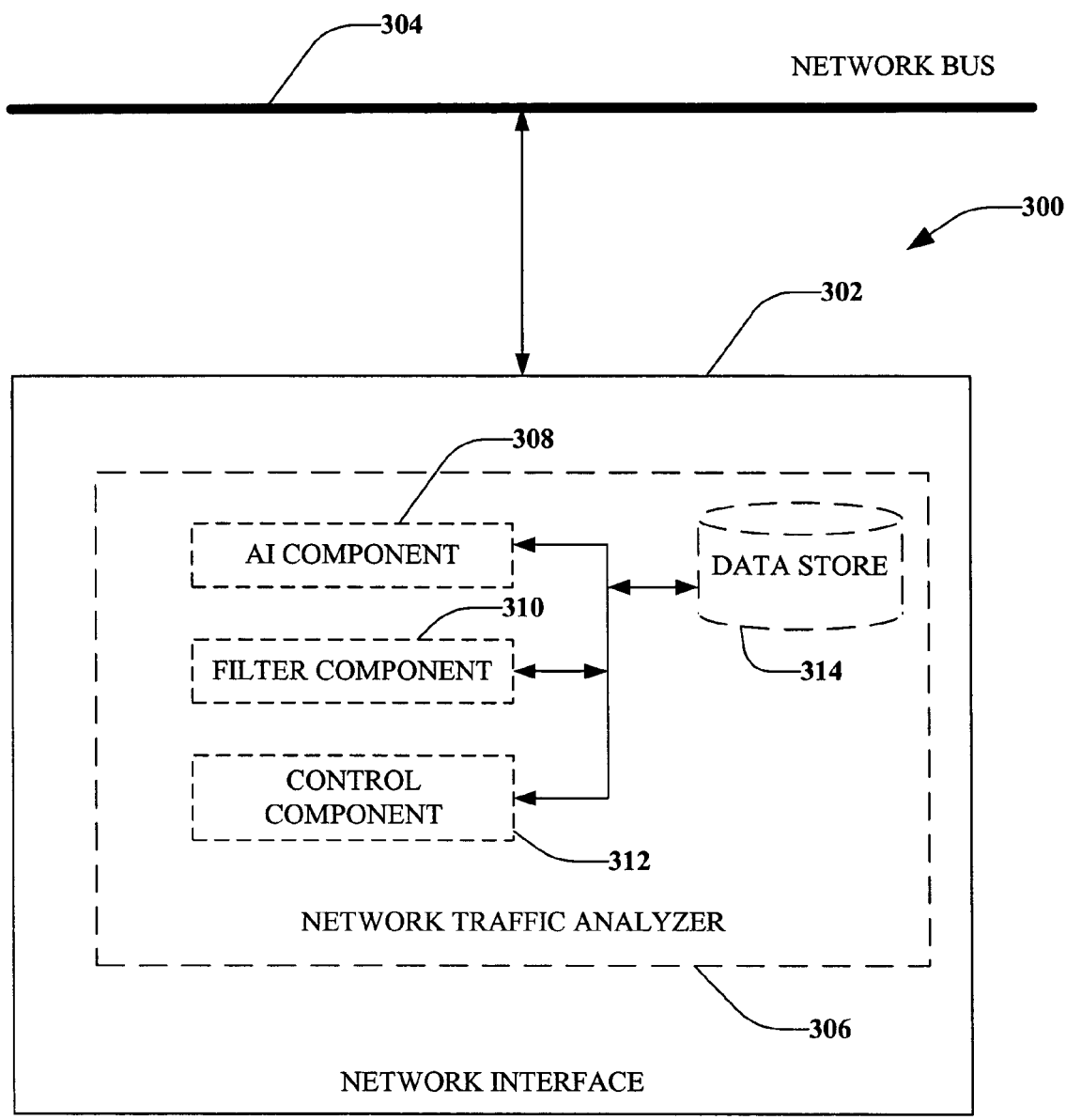
FIG. 3A is a high-level schematic diagram of an embedded network traffic analyzer in accordance with the subject invention.

FIG. 3A illustrates a high level schematic diagram of a system 300 in accordance with the subject invention. A network interface 302 is shown that interfaces with a network bus 304. The network interface 302 includes a network traffic analyzer (NTA) 306 embedded therein. The NTA 306 by being integrated with the network interface 302 overcomes many of the aforementioned drawbacks associated with conventional NTAs that are separate items of hardware. The NTA 306 in accordance with the subject invention can optionally comprise an artificial intelligence component 308 (e.g., implicitly trained classifier, explicitly trained classifier, neural network, non-linear training component, Bayesian belief network, data fusion engine, . . . ) that facilitates diagnosing and/or prognosing state/health of a network (and components thereof) that is analyzed by the NTA 306. The NTA 306 further comprises a data acquisition component component 310 that can provide for filtering and collecting network data so as to provide for meaningful analysis thereof by the NTA 306. A control component 312 facilitates the NTA 306 to regulate and/or assist with control of network data, the network bus, the interface 302, the network and/or components thereof. A data store 314 stores information relevant to operations of the network and the NTA 306. For example, classifiers of the AI component 308 or a portion thereof can be stored in the data store 314. Likewise, historical data (e.g., lookup tables, data signatures, etc.) can be stored and accessed by the NTA 306 to facilitate carrying out functions provided by the NTA 306 as described within the subject specification.

Figure 3B:
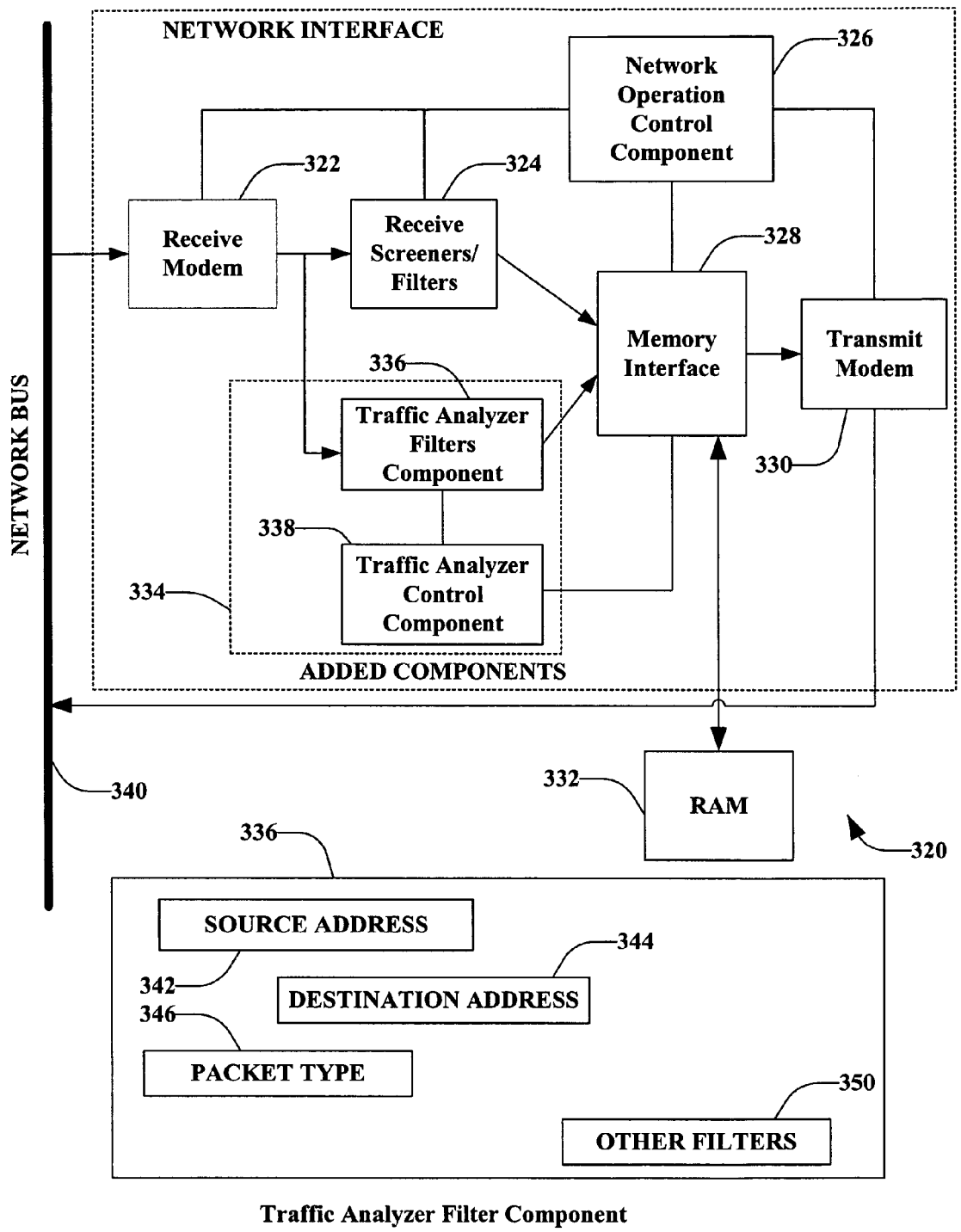
FIG. 3B is an illustration of a network interface with an embedded network traffic analyzer in accordance with an aspect of the present invention.

FIG. 3B is an illustration of a network interface 320 with an embedded network traffic analyzer in accordance with an aspect of the present invention. Network interface 320 is comprised of various components that implement standard network interface protocol along with additional components required to implement an embedded network traffic analyzer in accordance with an aspect of the present invention. The standard components can include a receive modem 322, a receive screeners/filters 324, a network operation control component 326, a memory interface 328 and a transmit modem 330. It is appreciated that a subset of these components may not be required to effect the subject invention, and therefore such components should not be construed to limit the scope of the subject invention. The receive modem 322 is coupled to the network bus 340 to receive signals transmitted onto the network bus by other devices. Similarly, the transmit modem 330 is coupled to a network bus 340 to transmit signals to the network from the device containing the network interface. Although the receive modem 322 and transmit modem 330 are illustrated as separate components, it is understood that both components can be implemented in a single transceiver component capable of both transmitting and receiving information to and from the network bus. The receive modem 322 is coupled to the receive screeners/filters 324. The receive screeners/filters 324 determine whether the information placed on the network is intended for this particular device. Each device on the network is typically assigned a unique identifier. The receive screeners/filters 324 recognize the unique identifier and determine whether the information on the network is intended for the respective device. The receiver screener/filter 324 is coupled to the receive modem 322, the normal operation control component 326 and the memory interface 328. Once determined that the data on the network is intended for the device in question, then the normal operation control component 326 interprets and responds to the information accordingly. The memory interface 328 is coupled to receive screeners/filters 324, normal operation control component 326, transmit modem 330, and external random access memory (RAM) 332. Although the RAM 332 is illustrated as being external to the network interface, it is understood that the RAM can be implemented internally as well, or RAM 332 can be implemented as a combination of both internal memory and external memory. As direct by network operation control component 326, memory interface 328 uploads data from RAM 332 or downloads data to RAM 332 as necessary. Data is then passed as necessary from RAM 332 through memory interface 328 to transmit modem 330 and onto the network or from the receive screeners/filters 324 and through the memory interface 328 and into RAM 332.

The network interface 320 with embedded network traffic analyzer is implemented as an Application Specific Integrated Circuit (ASIC). The particular makeup of the components of the ASIC varies in accordance with the requirements for the intended network standard and protocol. Although illustrated as being implemented in an ASIC, it is understood that the present invention can be implemented with standard integrated circuits, discreet components, more than one ASIC, a combination thereof, or in any manner which replicates the required function and the present invention is intended to encompass all such configurations.

By adding the additional components 334 to the network interface, any suitable device comprising the network interface with the additional components can be employed as a network traffic analyzer. The additional components 334 are comprised of traffic analyzer filters component 336 and traffic analyzer control component 338. Data on the network is received by the receive modem 322 and passed to the traffic analyzer filters component 336. The traffic analyzer filters component 336 comprises a source media access control (MAC) identifier (ID) filter component 342, a destination MAC ID filter component 344, a packet type filter component 346 (scheduled, unscheduled, etc.), and other filter components 350 to capture information pertinent to the network protocol. For example, such other filter components may include, but not be limited to a sequence number filter component, a packet length filter component, a checksum data component, and any other information pertinent to the given network protocol. The combination of all the filters allow the network interface to determine which device is the source of data being transmitted, which device is the destination for the data being transmitted, the type of information being transmitted, the length of the data being transmitted and other information pertinent to diagnosing network problems. Control of the network traffic analyzer is accomplished by the traffic analyzer control component 338. The traffic analyzer control component includes, but is not limited to, a monitoring component, a collection start/stop component, a memory configuration and status component, and a memory upload/download component. The monitoring component monitors the normal device operations to determine available processor and memory access bandwidth which can be utilized for network traffic analyzer functions. The collection start/stop component determines conditions for which data collection will start and stop. Start and stop conditions can be triggered by many different conditions including, but not limited to, time, duration, presence of a particular condition, packet type, or data or absence of a particular condition, packet type or data. The memory configuration and status components along with the memory upload/download components help control the management of collected data to and from memory.

The additional components include hardware and firmware to fulfill the operation as an embedded network traffic analyzer. The added firmware includes extensions to a standard debug object to provide an interface to the network traffic analyzer. The additional firmware comprises necessary information for the particular network including filter configuration, memory configuration an associated status, collection start and stop, and network traffic analyzer memory upload. With the additional hardware and firmware components, the interface device can start and stop collecting, recording and analyzing data in accordance with a prescribed set of conditions.

Figure 4:
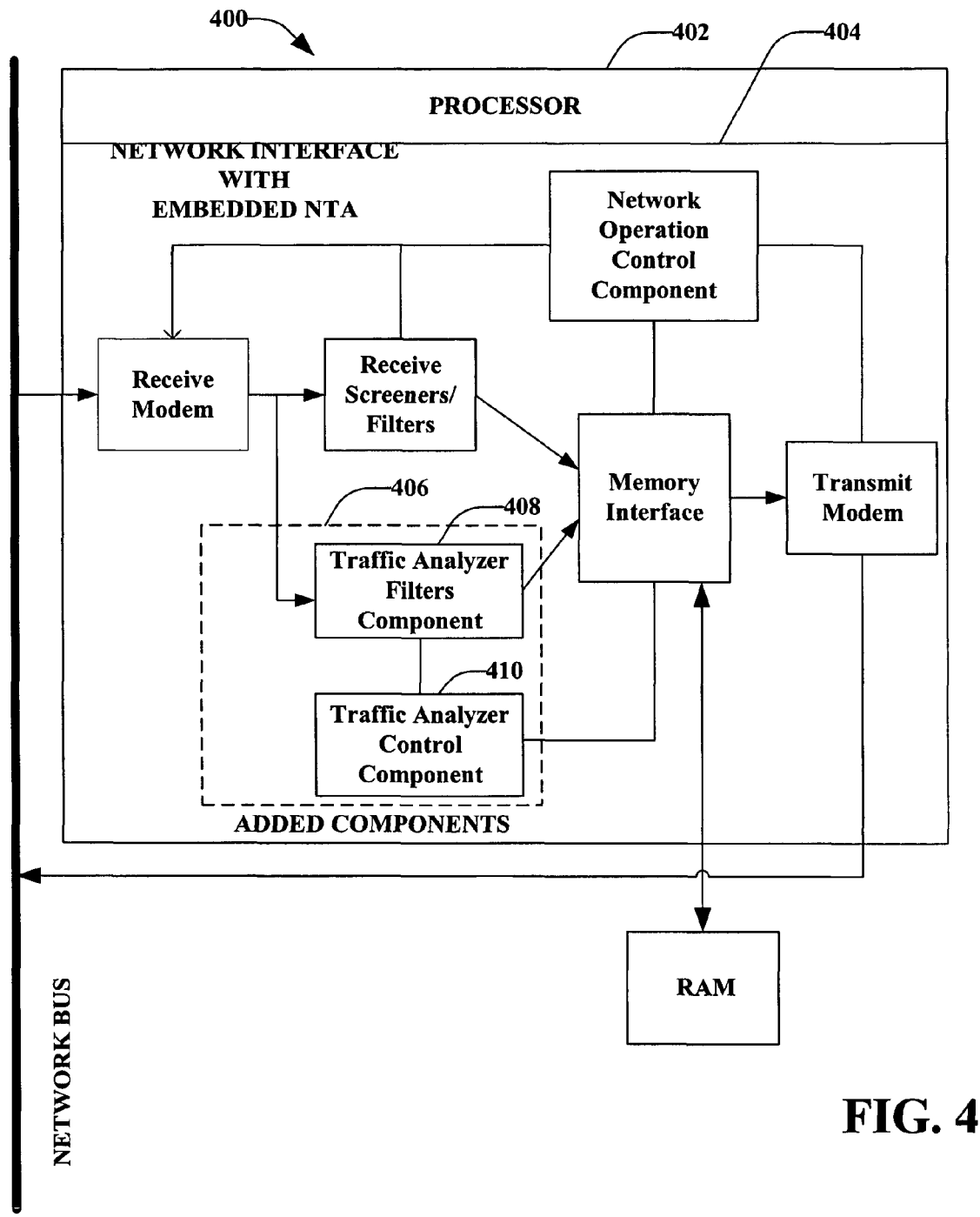
FIG. 4 illustrates a device comprising a processor and a network interface comprising the embedded network traffic analyzer in accordance with the present invention.
Figure 5:
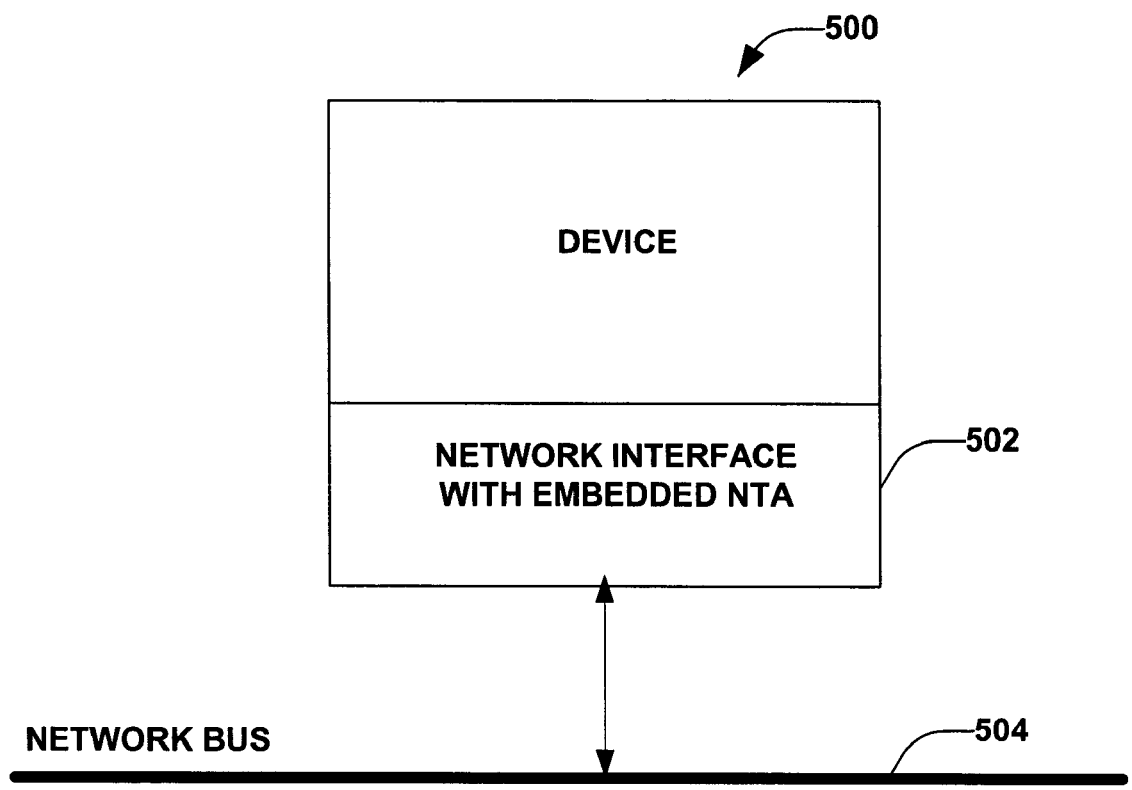
FIG. 5 illustrates a device comprising a network interface with an embedded network traffic analyzer coupled to a network in accordance with an aspect of the present invention.

By adding the additional components to a device with a network interface, the device is configurable as a network traffic analyzer. FIG. 4 illustrates a device 400 comprising a processor 402 and a network interface 404 with an embedded network traffic analyzer 406 in accordance with the present invention. The embedded network traffic analyzer 406 is comprised of a traffic analyzer filter component 408 and traffic analyzer control component 410, both hardware and associated firmware. When connected to a network, the device will function as a network traffic analyzer for the network to which it is connected. This is illustrated in FIG. 5 where device 500 comprising a network interface with embedded network traffic analyzer 502 is coupled to a network 504. The device 500 can be a standard PC, a network printer, a network scanner, or any device with a network interface to which the network traffic analyzer components have been added. In accordance with one aspect of the invention, the device 500 can be operated in different modes. For example, in one mode the operation of device 500 is dedicated to a normal function (e.g. a PC, printing, scanning, etc.). In another mode the device 500 can operate as a dedicated network traffic analyzer. While in yet another mode, the device 500 combines its normal function(s) with network traffic analyzer functionalities. In such mode, priority is given to the devices' normal operation; the network traffic analyzer functions may utilize excess device resources such as processor and memory bandwidth. In any mode, complex sorting and searching tasks can be performed at a later point in time, for example as post processing operations on a computer comprising the present invention, or the data gathered by the device can be transferred via the network to another processor for post processing and analysis.

Figure 6:
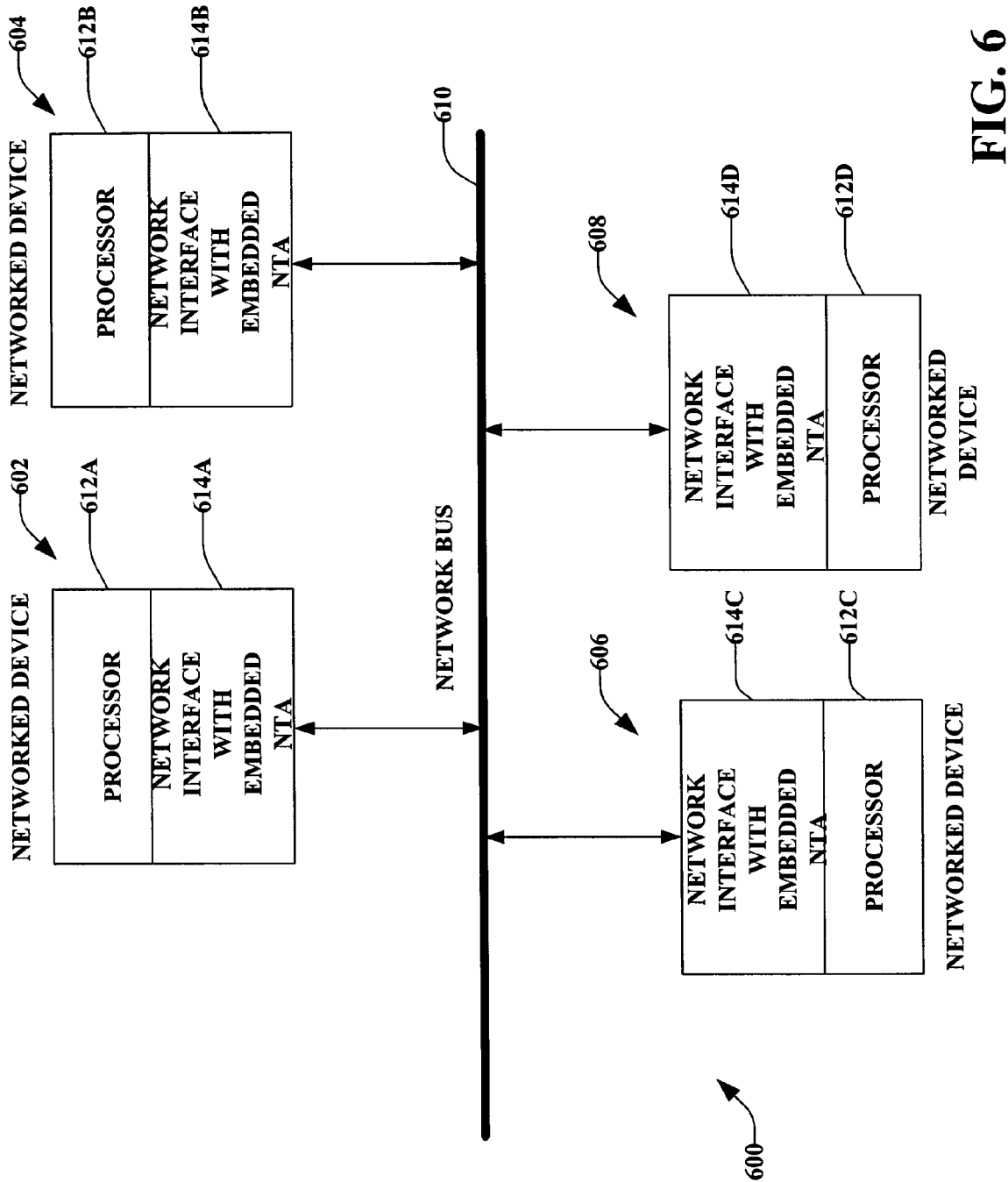
FIG. 6 is an illustration of more than one device with a network interface comprising an embedded network traffic analyzer coupled to a network in accordance with an aspect of the present invention.

In accordance with another aspect of the invention, more than one device with a network interface comprising an embedded network traffic analyzer is coupled to a network. FIG. 6 is an illustration of one such system, system 600. System 600 is comprised of networked device 602, networked device 604, networked device 606, networked device 608, and network bus 610. Each of the networked devices 602, 604, 606 and 608 comprise a processor 612 and a network interface with an embedded network traffic analyzer 614 in accordance with an aspect of the present invention. Since one or more devices on network 610 comprise a network interface with an embedded network traffic analyzer, any one or more of the devices can function as a network traffic analyzer, thereby obviating the need for a dedicated network traffic analyzer. Incorporation of the network traffic analyzer components into one or more devices on the network removes the need for the dedicated network traffic analyzer. Because the NTA can be incorporated into devices which are routinely connected to the network, the network configuration does not need to be altered or disturbed to accommodate a dedicated network traffic analyzer.

Accordingly, the ability to diagnose and isolate network problems is improved, in accordance with another aspect of the invention. Because adding a dedicated network traffic analyzer changes the configuration of the network and the loading on the network bus, the manifestation of problems can be altered. Sometimes, the mere addition of an additional device, such as a dedicated network traffic analyzer will mask a network problem or introduce a new problem. The incorporation of the network traffic analyzer into the interface eliminates the need to alter the network configuration and loading characteristics by inserting a dedication network traffic analyzer into the network. Although the system 600 is illustrated with each device containing an embedded network traffic analyzer, it is understood that only one of devices is required to have an embedded network traffic analyzer in accordance with an aspect of the present invention.

Figure 7A:
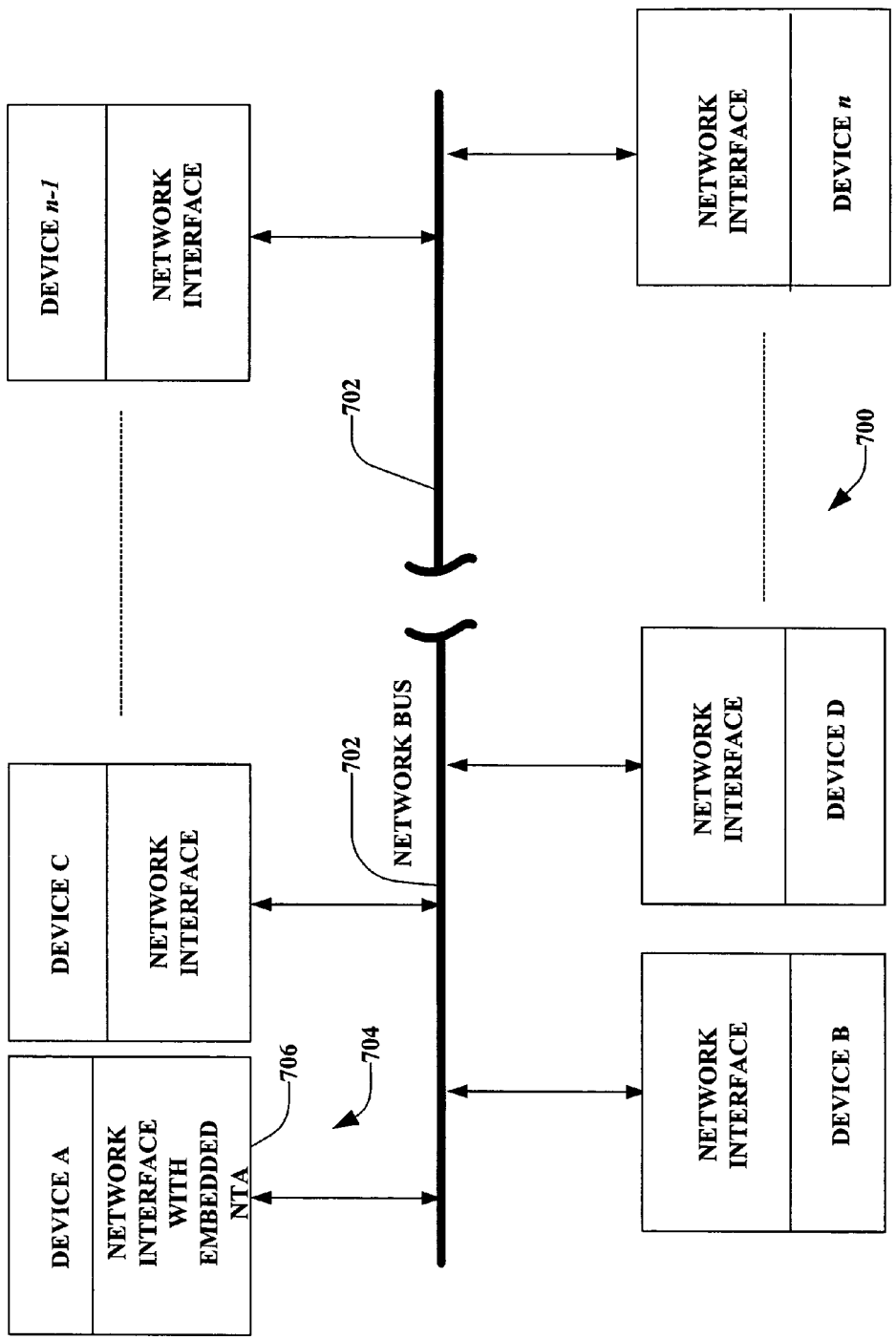
FIG. 7A is an illustration of a networked system comprised of n devices coupled to network bus in accordance with an aspect of the present invention.

FIG. 7A is an illustration of a system 700 comprised of devices coupled to network bus 702. In system 700, device A, 704 is the only device is coupled to network bus 702 with a network interface with embedded network traffic analyzer 706. The other devices are coupled to network bus 702 with network interfaces which do not include an embedded network traffic analyzer. If problems exists on the network with communications to or from any of the n devices coupled to the network, then device A, 704 is utilized as a network traffic analyzer to analyze the problem.

Figure 7B:
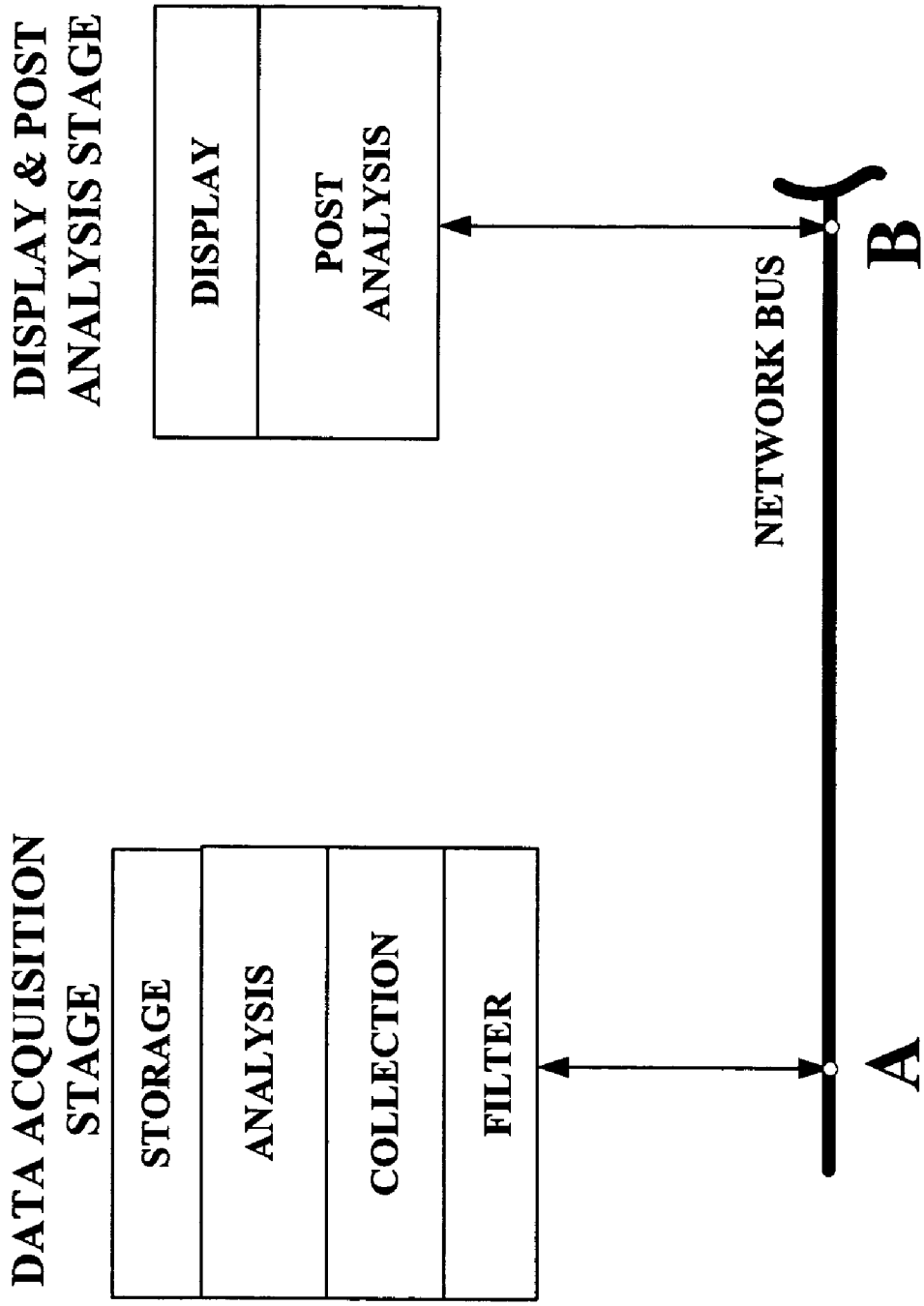
FIG. 7B illustrates a divided arrangement of a traffic analyzer according to one aspect of the present invention.

According to one aspect of the present invention, a typical one piece traffic analyzer comprising a single stack that performs various associated functions (e.g. filtering, data collection, analysis, storage, post analysis, display) can be split and positioned at various locations of a network. FIG. 7B illustrates such a divided arrangement, which can provide for additional flexibility and an increased efficiency when employing available resources on a network. As illustrated in the exemplary arrangement according to one aspect of the present invention, functions related to filtering, data collection, analysis and storage can be performed at location A on the network, and as part of a data acquisition stage, while display and post analysis functions can be assigned to another location B on the network, as part of a post analysis and display stage.

Figure 8:
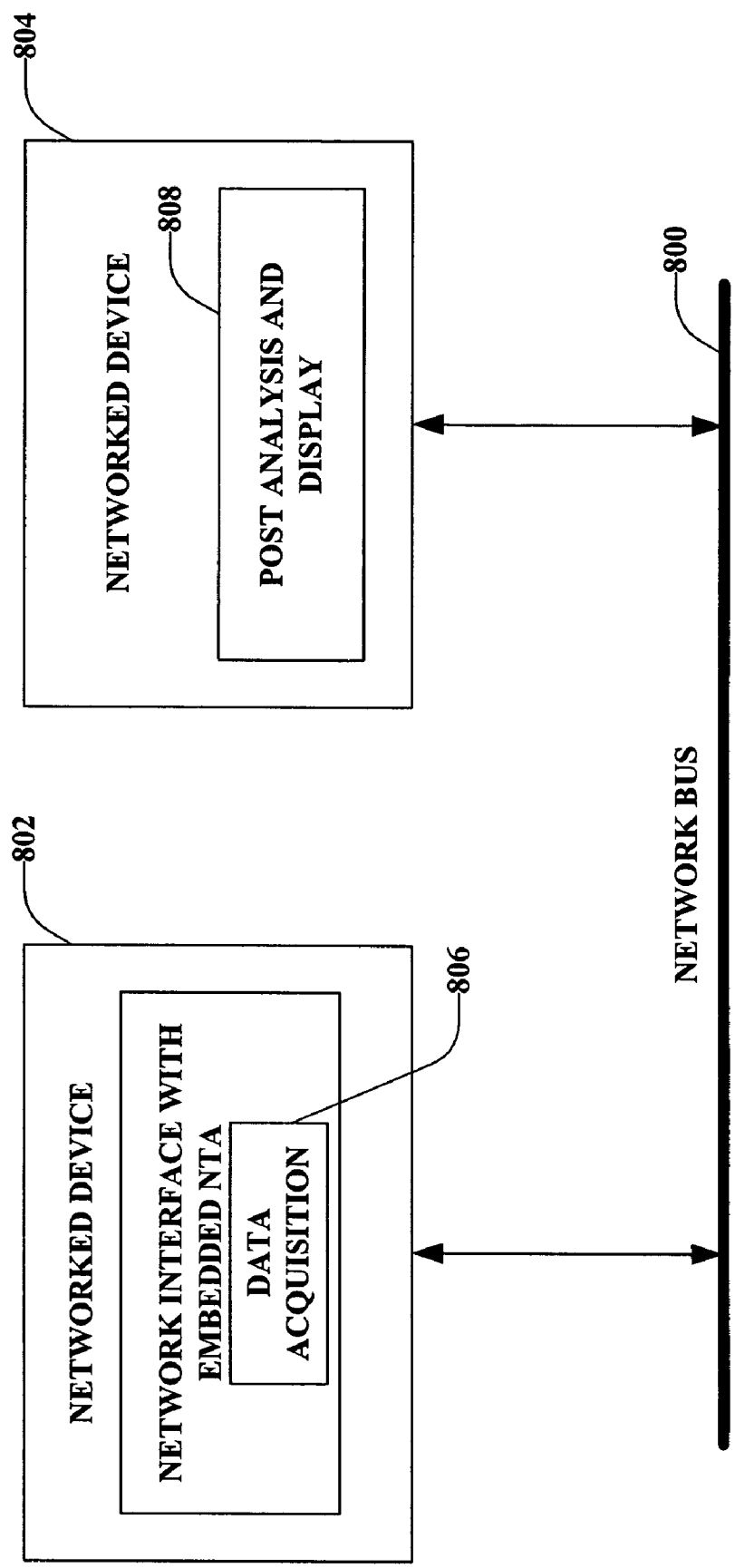
FIG. 8 is an illustration of one device on the network containing the network interface data acquisition component and another device containing the network interface post analysis and display component in accordance with an aspect of the present invention.

In accordance with another aspect of the present invention, one or more devices on the network assume control of another device containing a network interface comprising the embedded network traffic analyzer's data acquisition component. This is illustrated in FIG. 8 wherein two networked devices 802 and 804 are coupled to network bus 800. Network device 802 is comprised of a network interface with the embedded network traffic analyzer including the data acquisition component 806. Network device 804 is a device comprising a network interface with the post analysis and display component for an embedded network traffic analyzer. Either of the networked devices 802 and 804 may control the acquisition component of the embedded network traffic analyzer embedded in device 802. Networked device 802 can also contain all the components typically necessary to function as a fully functional network traffic analyzer when commanded. Data acquisition component 806 of networked device 802 can be commanded internally by networked device 802, or externally through the network bus 800. The network interface of networked device 804 contains the necessary control component 808 to control the acquisition component 806 of the embedded network traffic analyzer in networked device 802. In accordance with an aspect of the present invention, incorporation of the control component into separate devices allows for remote access and control of the various functions of an embedded network traffic analyzer that are divided into various locations in a network. Networked device 804 can issue control commands through the network interface and onto network bus 800. Networked device 802 can then receive the commands off network bus 800 and can thereby be remotely controlled by network device 804. It is to be appreciated that the control component can similarly control more than one post-analysis and display component.

Figure 9:
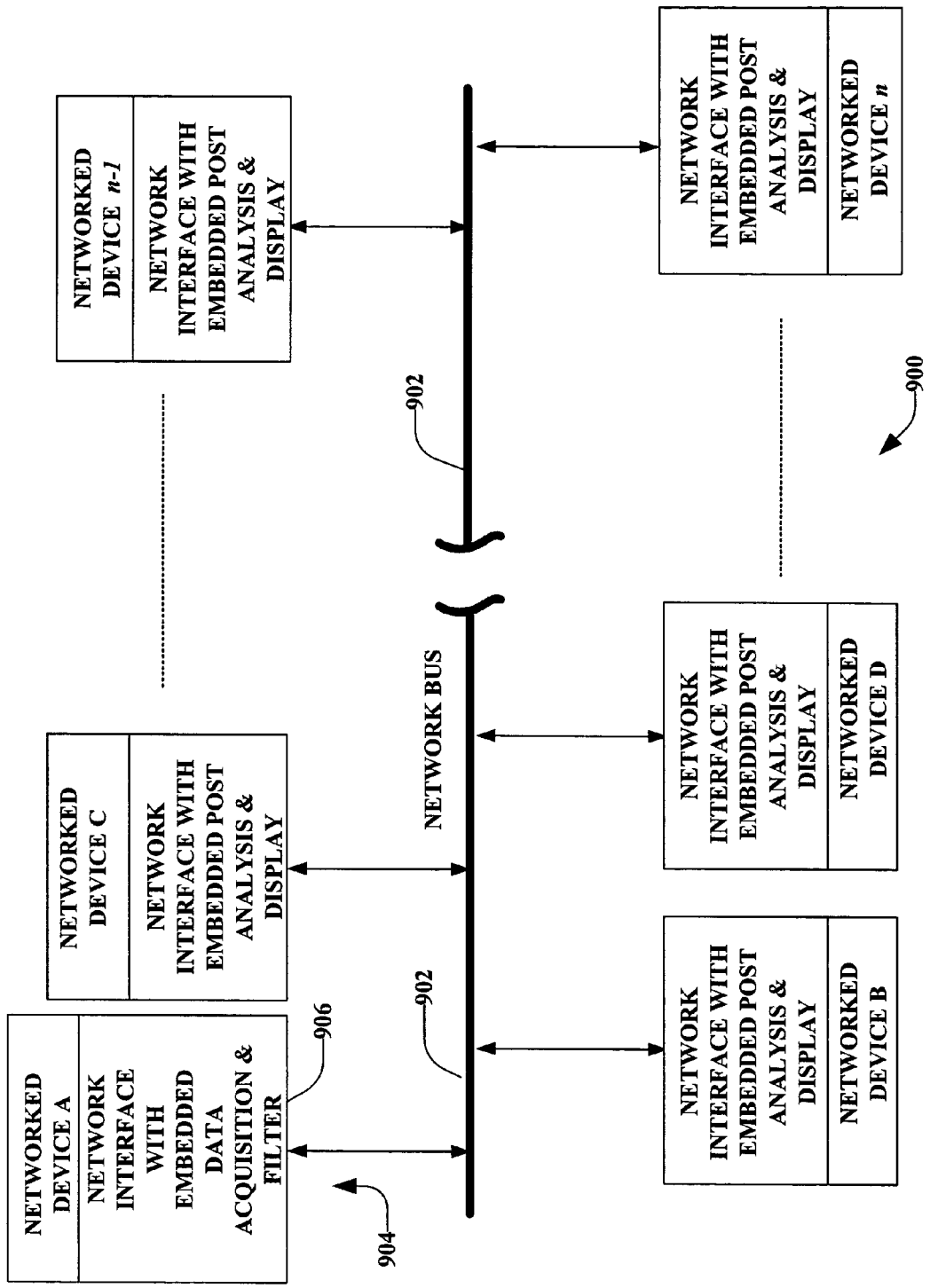
FIG. 9 is an illustration of n networked devices coupled together by a network bus in accordance with an aspect of the present invention.

FIG. 9 illustrates extending this concept to a larger scale. Networked system 900 illustrated in FIG. 9 is comprised of n networked devices coupled together by network bus 902. Only one device, 904, in networked system 900 contains the data acquisition and filter component 906 required for certain functions of an embedded network analyzer. At the same time, the other n−1 devices contain network interfaces that comprise the network traffic analyzer post analysis and display component. As such, any one of the devices containing the network traffic analyzer post analysis and display component can perform the related functions. It is understood that the present invention can be implemented with other arrangements for positioning the various functions of; filtering, data collection, analysis, storage, post analysis, and display, associated with a network analyzer at several locations on a network bus.

Figure 10:
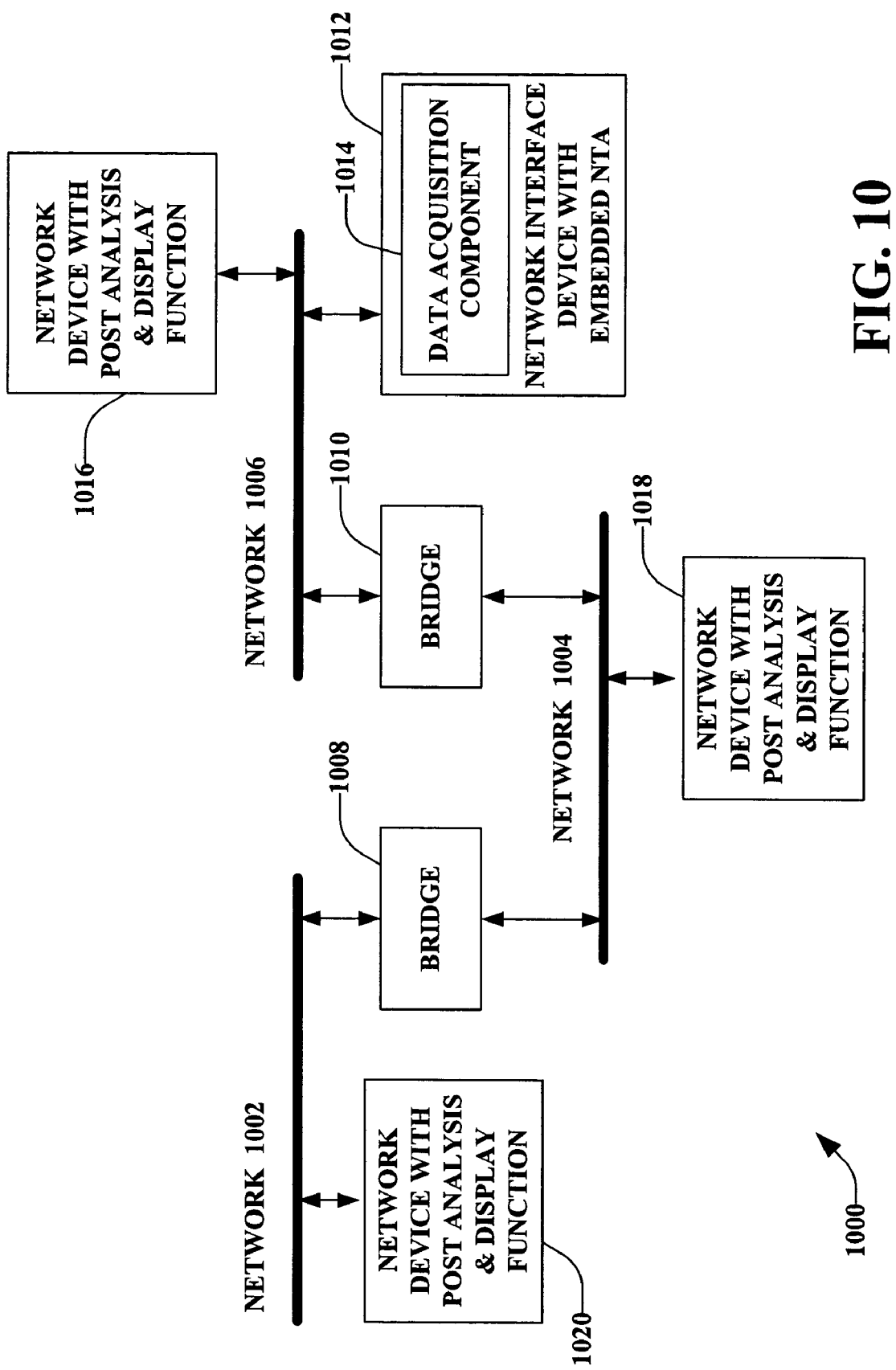
FIG. 10 is an illustration of bridging techniques used to couple separate smaller networks into larger combined networks are used to allow control of an embedded network traffic analyzer from locations far removed from the embedded network traffic analyzer in accordance with an aspect of the present invention.

FIG. 10 extends the concept one level further in accordance with another aspect of the present invention. Bridging techniques used to couple separate smaller networks into larger combined networks are used to allow control of an embedded network traffic analyzer from locations far removed from the embedded network traffic analyzer. In FIG. 10, a system of networks 1000 is comprised of three networks, network 1002, network 1004, and network 1006. Network bridges 1008 and 1010 are used to bridge the otherwise separate networks together into a larger more complex network. Network bridge 1008 joins network 1002 and network 1004 together so that devices coupled to one network may communicate with devices coupled to the other network. Similarly, network bridge 1010 joins network 1004 and network 1006 together. With both network bridges 1008 and 1010 in place, networked devices on network 1002 can exchange information with networked devices on network 1006. Network device 1012 is configured with a network interface comprising an embedded network traffic analyzer, including the collection, filtering and analysis component 1014. Each of networked devices 1016, 1018, and 1020 can also be configured with a network traffic analyzer control component. Anyone of these networked devices can issue commands and control the network traffic analyzer data acquisition component 1014 of device 1012.

Although FIG. 10 illustrates 3 separate networks combined by network bridges, it is understood that the present invention encompasses bridging and similar techniques across a virtually limitless number of and type of networks to allow control of an embedded network traffic analyzer from remote locations. Bridging allows combining of different types of networks over very long distances. Through use of the many networks of the internet, this type of configuration allows device 1020 to be literally located thousands of miles from the embedded network traffic analyzer of device 1012. It is to be appreciated that the bridge can have an NTA embedded or integrated therein if desired.

Figure 11:
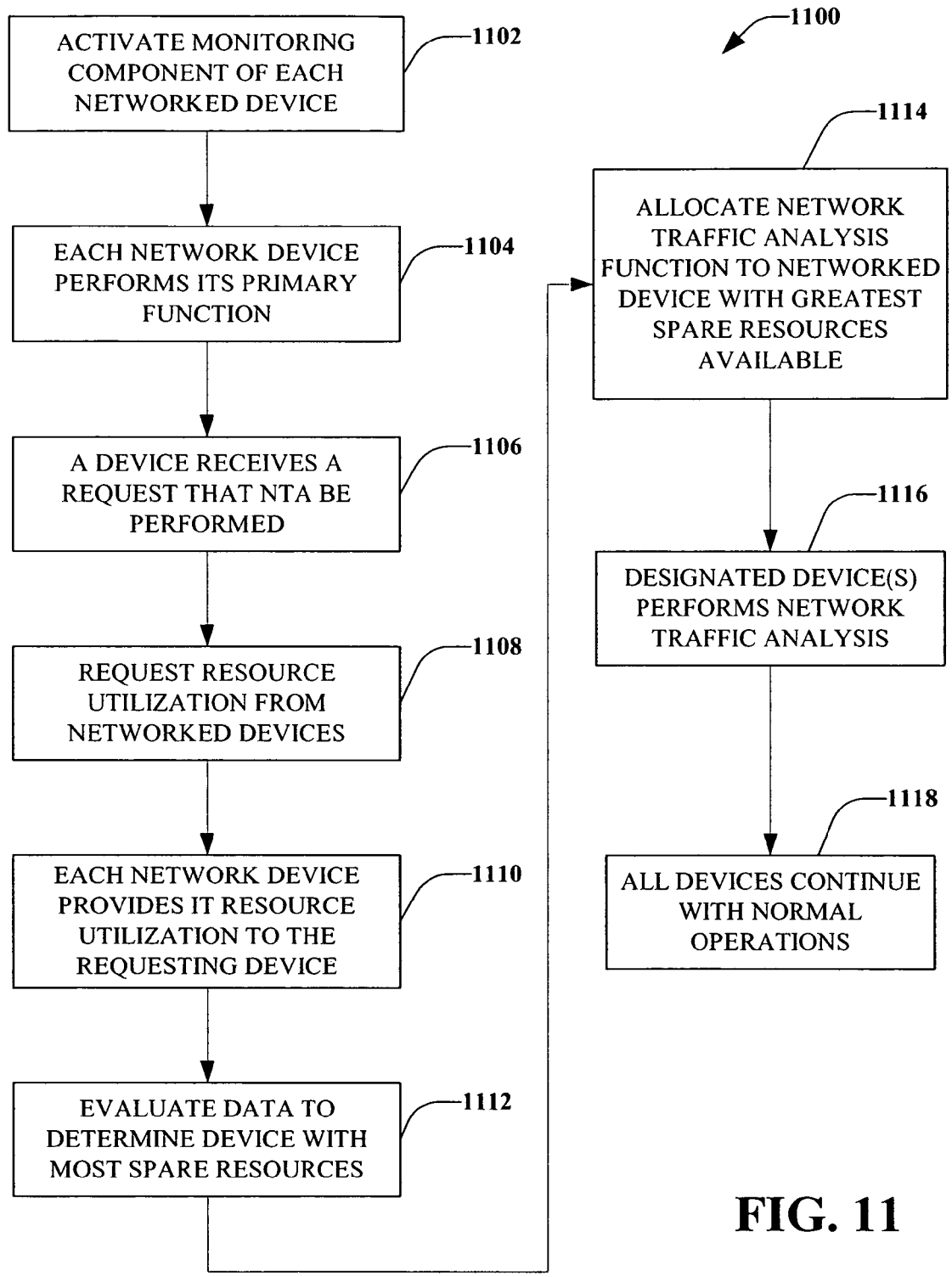
FIG. 11 illustrates one particular methodology for allocating network traffic analysis tasks implemented in accordance with the present invention.

In view of the foregoing structural and functional features described above, methodologies in accordance with various aspects of the present invention will be better appreciated with reference to FIG. 11. While, for purposes of simplicity of explanation, the methodologies of FIG. 11 are shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect the present invention.

In accordance with one aspect of the present invention, the post analysis component of the network traffic analyzer also contains a monitoring component. Such monitoring component monitors the resource utilization (e.g. processor and memory bandwidth utilization) of the network device in which it is installed. FIG. 11 illustrates one particular methodology 1100 implemented in accordance with the present invention. The process begins at 1102 where the monitoring component is activated in each networked device comprising the post analysis and display component. The process continues at 1104 where the networked devices perform their primary functions. The primary functions may be associated with printing, scanning, PC program execution, or any task not associated with the network traffic analyzer function. At 1106, a device receives a request that some network traffic analysis needs to be performed. At 1108, the device issues a request to all devices on the network to provide resource utilization from the monitoring component. At 1110, each device provides the resource utilization data back to the requesting device. At 1112, the requesting device analyzes the resource utilization data and determines which devices have the greatest amount of resources available for the network traffic analysis control and debug functions. At 1114, the requesting device determines which of the networked devices will execute the network analysis function and assigns the functions accordingly. The data acquisition (e.g. collection and filtering) and the post analysis filtering function may be assigned to the same device or the data acquisition function may be assigned to one device and the post analysis and display function assigned to another device. In either case, at 1116 the designated device(s) perform their network traffic analysis and at 1118 all devices continue with their normal operations. This method assures that the network traffic analysis is performed as expeditiously as possible without overburdening network devices which are sustaining heavy workloads at the time the request for network traffic analysis is received.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for allocating network traffic analysis tasks to networked devices comprising:
   activating respective monitoring components of a network traffic analyzer embedded into network interfaces of a plurality of devices of a network;
   requesting resource utilization data from a subset of the activated monitoring components;
   accepting resource utilization data from the subset of activated monitoring components;
   evaluating the resource utilization data;
   determining which devices have greatest available resources based at least in part on the resource utilization data; and
   allocating network traffic analysis tasks based at least in part on the available resources.

2. A method for allocating network traffic analysis tasks to networked devices comprising:
   activating a monitoring component of a network traffic analyzer embedded into network interfaces of more than one device on a network;
   requesting resource utilization data from each activated monitoring component;
   accepting resource utilization data from each activated monitoring component;
   evaluating the resource utilization data;
   determining which device has a greatest available resources based at least in part on the resource utilization data; and
   allocating the network traffic analysis tasks to the device with the greatest available resources.

3. A method for allocating network traffic analysis tasks to networked devices comprising:
   activating a monitoring component of a network traffic analyzer embedded into network interfaces of more than one device on a network;
   requesting resource utilization data from each activated monitoring component;
   accepting resource utilization data from each activated monitoring component;
   evaluating the resource utilization data;
   determining available resources for each device based at least in part on the resource utilization data;
   allocating a network traffic analysis debug task to the device with the greatest available resources; and
   allocating a network traffic analysis control task to the device with second greatest available resources.

4. A system, comprising:
   a first network device, comprising:
      a first processor;
      a first memory; and
      a first network interface embedded with a first network traffic analyzer,
   comprising: a first traffic analyzer filters component that captures a first data pertinent to diagnosing network problems;
   a second network device, comprising:
      a second processor;
      a second memory; and
      a second network interface embedded with a second network traffic analyzer, comprising: a second traffic analyzer filters component that captures a second data pertinent to diagnosing network problems; and
   a third network device, comprising:
      a third processor;
      a third memory; and
      a third network interface embedded with a third network traffic analyzer,
   comprising: a traffic analyzer control component that requests the first data and the second data, evaluates the first data and the second data and determines which of the first network device or the second network devices has a greater available resources, and allocates network traffic analysis task to the first network device or the second network device with the greatest available resources.

5. The system of claim 4, wherein at least one of the first traffic analyzer filters component or the second traffic analyzer filters component comprises a source media access control (MAC) identifier (ID) filter component that identifies a source device for at least one of the first data or the second data and a destination MAC ID filter component that identifies a destination device for at least one of the first data or the second data.

6. The system of claim 4, wherein at least one of the first traffic analyzer filters component or the second traffic analyzer filters component comprises a packet type filter component that determines a type of at least one of the first data or the second data.

7. The system of claim 4, wherein at least one of the first traffic analyzer filters component or the second traffic analyzer filters component comprises at least one of a sequence number filter component, a packet length filter component, or a checksum data component.

8. The system of claim 4, wherein the traffic analyzer control component comprises a monitoring component that monitors normal device operations that determines a bandwidth of the processor and the memory available for the network traffic analyzer.

9. The system of claim 4, wherein the traffic analyzer control component comprises a collection start/stop component that determines at least one start condition for which at least one of the first network traffic analyzer filters component or the second network traffic analyzer filters component starts collecting at least one of the first data or the second data and at least one stop condition for which at least one of the first network traffic analyzer filters component or the second network traffic analyzer filters component stops collecting at least one of the first data or the second data.

10. The system of claim 9, wherein at least one of the start condition or the stop condition is triggered by at least one of a time, a presence of a packet type, or an absence of a packet type.

11. The system device of claim 4, wherein at least one of the first processor, the second processor or the third processor executes a normal function mode in which the device is dedicated to normal functions and a network traffic analyzer function mode in which the device is dedicated to network traffic analyzer functions.

12. The system of claim 4, wherein at least one of the first processor, the second processor or the third processor executes normal functions and network traffic analyzer functions.

13. The system of claim 12, wherein at least one of the first processor, the second processor or the third processor gives priority to the normal functions and the traffic analyzer functions utilize excess processor and memory bandwidth.

14. A system, comprising:
a network bus;
a first network device connected to the network bus at a first location, comprising:
a first processor; and
a first network interface embedded with a network traffic analyzer data collection component that collects resource utilization data for at least two devices connected to the network bus; and
a second network device connected to the network bus at a second location, comprising:
a second processor; and
a second network interface embedded with a network traffic analyzer control component that controls the network traffic analyzer of the first network device from a remote location, wherein the network traffic analyzer control component requests the resource utilization data from the network traffic analyzer data collection component, accepts the resource utilization data, evaluates the resource utilization data, determines which of the at least two devices has a greatest available resources based at least in part on the resource utilization data and allocates network traffic analysis tasks to the device with the greatest available resources.

* * * * *